United States Patent
Shin

(10) Patent No.: US 8,013,029 B2
(45) Date of Patent: Sep. 6, 2011

(54) MORTAR FOR CONCRETE HAVING POLYURETHANE FOAM AND METHOD OF THEREOF

(76) Inventor: Soon-Ok Shin, Okcheon-Gun (KR)

( * ) Notice: Subject to any disclaimer, the term of this patent is extended or adjusted under 35 U.S.C. 154(b) by 0 days.

(21) Appl. No.: 12/741,684

(22) PCT Filed: Nov. 9, 2007

(86) PCT No.: PCT/KR2007/005640
§ 371 (c)(1),
(2), (4) Date: Sep. 8, 2010

(87) PCT Pub. No.: WO2009/061016
PCT Pub. Date: May 14, 2009

(65) Prior Publication Data
US 2010/0331434 A1    Dec. 30, 2010

(51) Int. Cl.
*C04B 28/00* (2006.01)
*C04B 24/02* (2006.01)
*C04B 38/08* (2006.01)
*C08K 11/00* (2006.01)

(52) U.S. Cl. ........... 521/83; 524/3; 524/5; 524/7; 524/8; 523/129

(58) Field of Classification Search ............ 521/83; 524/3, 5, 7, 8; 523/130
See application file for complete search history.

(56) References Cited

U.S. PATENT DOCUMENTS

| | | | | |
|---|---|---|---|---|
| 4,127,548 A | * | 11/1978 | Alexander | 524/4 |
| 4,407,676 A | * | 10/1983 | Restrepo | 521/54 |
| 5,904,763 A | * | 5/1999 | Blocken | 106/696 |
| 2007/0004826 A1 | * | 1/2007 | Bayer et al. | 524/27 |

* cited by examiner

*Primary Examiner* — Randy Gulakowski
*Assistant Examiner* — Kara Negrelli
(74) *Attorney, Agent, or Firm* — Greer, Burns & Crain, Ltd.

(57) ABSTRACT

Disclosed are a mortar for concrete mainly consisting of urethane foam and a method for manufacturing the same, in which urethane foam and Styrofoam used as insulating materials for household electronic appliances and a pre-cast panel are not discarded, but recycled such that the urethane foam and the Styrofoam are mixed with concrete in the construction of flooring of apartments or an ondol of houses. Low weight structure, superior sound-absorption effect and heat insulation effect can be obtained, and cracks are prevented from being generated in the constructed part. Construction work is simplified, and economical efficiency is enhanced. Collected waste urethane foam and waste Styrofoam are pulverized into a size of 1 to 10 mm using a pulverizer. The pulverized urethane foam and Styrofoam are mixed to each other to form urethane foam. Admixture is added to the urethane foam, and then cement and water are mixed with the urethane foam in a predetermined ratio to form a lightweight insulating urethane foam concrete mortar using a mixer and a truck mixture. The lightweight insulating urethane foam concrete mortar is manufactured and is transported from a mixing area to a construction part such that materials of the concrete is prevented from being separated from each other. The concrete is poured using squeezing equipment and hydraulic transfer equipment and then cured for a predetermined curing time to prevent sudden change in the temperature.

2 Claims, No Drawings

MORTAR FOR CONCRETE HAVING POLYURETHANE FOAM AND METHOD OF THEREOF

TECHNICAL FIELD

The present invention relates to a mortar for concrete mainly consisting of urethane foam and waste synthetic resin and a method for manufacturing the same. More particularly, the present invention relates to a mortar for concrete mainly consisting of urethane foam and a method for manufacturing the same, in which urethane foam and Styrofoam used as insulating materials for household electronic appliances and panels for construction are not discarded, but recycled in such a manner that the urethane foam and the Styrofoam are mixed with concrete while in construction of ondol-flooring of apartments or houses. Therefore, a low weight structure, superior sound-insulation effect and heat insulation effect can be obtained, and cracks are prevented from being generated in the constructed part. In addition, construction work is simplified and economical efficiency is enhanced.

BACKGROUND ART

Production amount of polyurethane foam, which is fabricated by using raw materials imported at expensive cost, is assumed as a volume of about 450 to 500 thousand tons per year when taking the usage of the imported raw materials in to consideration. The polyurethane foam is used for various purposes in various fields. For instance, the polyurethane foam is used as insulating materials for household electronic appliances including refrigerators or construction panels. However, the treatment of the used polyurethane foam is not easy and reclamation or incineration is mainly used for treating the used polyurethane foam.

In general, since the polyurethane foam is a thermosetting resin, the polyurethane foam is not melted by heat and the recycling of polyurethane foam is not easily achievable. In addition, even after the polyurethane foam is incinerated, nitrogen and aromatic ring contained in the polyurethane molecules may remain. Also, in the case of the polyurethane foam used as the insulating material, Freon (CFC) serving as a foaming agent remains in the polyurethane foam after incineration. The nitrogen contained in the urethane generates nitrogen dioxide, thereby causing environmental contamination. In addition, the nitrogen generates fluorine, causing difficulty in treating the polyurethane through incineration. Further, since the polyurethane foam represents a low density, reclamation of the polyurethane foam is not easy, and since the polyurethane foam is hard-resoluble material, reclamation of the polyurethane foam is rarely allowable.

Accordingly, there is a need for developing a technology capable of effectively recycling the waste polyurethane foam.

In this regard, applicant of the present invention has filed a method for manufacturing urethane foam concrete by mixing cement, sand and water with squeezed urethane foam as represented in Korean Patent Registration No. 391558. However, the use of sand is necessary in the technique described above, so the amount of sand used for construction has been increased, thereby causing a shortage of natural sand. Accordingly, the urethane foam concrete representing the above effect without using sand is needed.

DISCLOSURE OF INVENTION

Technical Problem

The present invention has been made to solve the above problem occurring in the prior art, and an object of the present invention is to provide a mortar for concrete mainly consisting of urethane foam and waste synthetic resin that are not discarded after use, but recycled as construction materials when a flooring of apartments or houses is constructed. Therefore, the constructed part has a low weight, superior sound-insulation effect and heat insulation effect, cracks are prevented from being generated, construction work is simplified, and economical efficiency is enhanced.

Technical Solution

The foregoing and/or other aspects of the present invention are achieved by providing a mortar for concrete mainly consisting of urethane foam and a method for manufacturing the same, the method comprising the steps of forming urethane foam by collecting, pulverizing and mixing waste urethane foam and waste Styrofoam (S1);
adding admixture to the urethane foam obtained (S2); and
mixing cement with the materials obtained through the above steps (S3).

The waste urethane foam and the waste Styrofoam are preferably pulverized into a size of 2 to 10 mm, and the pulverized Styrofoam and the pulverized waste Styrofoam are preferably mixed in a weight ratio of 5-7:1-3.

In addition, the admixture prevents materials of the concrete from being separated from each other and serves as a plasticizer. The admixture preferably includes water-soluble cellulose ether based gray powder as a main composition.

In addition, in steps 2 and 3, the mortar preferably includes 60-80 volume percent of lightweight urethane foam, 1-4 volume percent of admixture and 16-40 volume percent of cement. If urethane foam content is less than 60 volume percent, the amount of cement is relatively increased, so economical efficiency is lowered. Meanwhile, if the urethane foam content is more than 80 volume percent, the strength of the concrete is too low to represent concrete properties. Accordingly, the above range of the urethane foam content is preferable. In addition, the admixture prevents the materials from being separated from each other and serves as the plasticizer in the range described above. If the cement content is less than 16 volume percent, the compressive strength of the concrete is remarkably lowered. If the cement content is more than 40 volume percent, the amount of lightweight urethane foam is relatively decreased, so that the concrete does not provide desired effects as alternative concrete.

The lightweight urethane foam mixed with the admixture and the cement is mixed with water in use by a conventional scheme to form urethane foam concrete.

In addition, the present invention provides a mortar for concrete mainly consisting of urethane foam, in which the urethane foam includes 60 to 80 volume percent of lightweight urethane foam obtained by mixing waste urethane foam and waste Styrofoam, which are pulverized into a size of 2 to 8 mm, in a weight ratio of 5-7:1-5, 1 to 4 volume percent of admixture, which prevents materials from being separated and serves as a plasticizer, and 19 to 40 volume percent of cement.

As described above, the present invention provides a method of manufacturing an insulating concrete material for construction by recycling waste urethane foam, which is produced from waste household electronic appliances and construction panels and usually incinerated, and urethane foam concrete manufactured by the same.

Advantageous Effects

As described above, the lightweight insulating urethane foam concrete using a mortar according to the present invention can be used as a lightweight insulating concrete in construction and civil engineering fields by recycling waste urethane foam, which is included in a waste refrigerator and a waste construction panel, as an insulating concrete material for construction. Thus, the economical efficiency is enhanced in terms of recycling of resources.

In other words, according to the lightweight insulating urethane foam concrete using a mortar of the present invention, specifically pulverized high quality urethane, which serves as insulating materials, is mixed with waste Styrofoam in a predetermined ratio to improve the sound absorbing effect, to prevent cracks from being generated, and enhance the heat insulation property and strength of the concrete. In addition, PPS admixture developed by applicant of the present invention is added to the concrete to prevent materials of the concrete from being separated from each other and to improve plasticization property. Accordingly, material scattering, foam scattering in a surface of constructed building, damage to surrounding structures, such as a wall plaster board, a frame of doors and a chassis, during the operation of a compact sized cart type mixer, and homogeneous combination of mixture, which are caused by the current construction scheme of concrete foam, can be minimized. In addition, the lightweight insulating urethane foam concrete represents superior effect without using sand having a problem in terms of supply, so economical efficiency is enhanced.

Accordingly, the mortar according to the present invention can be applied to construction work, as material for the flooring of the apartment and house ondol, roof insulating concrete, the bottom of a parking lot, and the bottom of the basement. In addition, the mortar is applied to structures in the civil engineering field for the tunnel grouting, the backfilling for preventing subsidence, the winter-sowing prevention, the heat insulation and the corrosion prevention for exposed pipes and the vibration and impact absorption.

BEST MODE FOR CARRYING OUT THE INVENTION

Hereinafter, a preferred embodiment of the present invention will be described in detail with reference to the accompanying drawings.

Recently, concrete foam, expandable concrete, expandable concrete foam, fiber mix expandable concrete, EVA (Ethylene-Vinyl Acetate) expandable concrete foam, BST (Bituminous Surface Treatment) expandable concrete foam, and urethane shell expandable concrete are used for insulating flooring in the construction of apartments or houses. Among them, the expandable concrete has been widely used for convenience sake in construction. However, the expandable concrete has a problem in that it generates cracks in the insulating layer.

In order to solve the above problem, various additives have been added to the expandable concrete, but the cracks are not effectively removed with the additives.

Currently, even though the concrete foam is preferably used than the expandable concrete, the concrete foam is not readily acceptable in the construction site since the insulating product businesses are incompetent for managing the construction site and the concrete foam product.

The present invention provides a mortar capable of manufacturing lightweight concrete used in flooring/wall insulating bricks that is practically perfect in terms of commercial value and workability.

To this end, according to the present invention, waste urethane foam produced from waste household electronic appliances, in particular, waste refrigerators or construction panels, is recycled to be used as construction materials. In addition, if the waste urethane foam is used as the construction materials, the development of the insulating concrete capable of providing various advantages including lightweight, superior sound absorption, superior heat insulation and workability has been expected. Accordingly, the present invention has been made to manufacture a lightweight insulating urethane foam concrete by recycling the waste urethane foam such that the urethane foam concrete is used for the flooring, the dry panels, and the bricks in the apartment houses. In particular, the present invention provides a method and a mortar for manufacturing urethane foam concrete, which does not contain sand having a problem in terms of supply and demand and causing supply problem in the construction site.

Exemplary Embodiment

According to the present invention, firstly, waste urethane foam generated from waste household electronic appliances or panels for construction is collected and pulverized into a size of about 1 to 10 mm. Similarly, waste polystyrene (Styrofoam) is collected and pulverized into a size of about 1 to 10 mm. The pulverized urethane foam and Styrofoam are mixed with each other in a weight ratio of 7:3 to form a lightweight urethane foam.

The lightweight urethane foam, admixture and cement are mixed with each other in a ratio shown in Table 1 below, and then mixed with water in a proper ratio.

TABLE 1

(Unit: %: volume ratio)

| | WASTE URETHANE FOAM:WASTE STYROFOAM | | URETHANE FOAM | ADMIXTURE | CEMENT |
|---|---|---|---|---|---|
| 1 | 1 | 1 | 51 | 1 | 48 |
| 2 | 7 | 3 | 60 | 4 | 36 |
| 3 | 6 | 4 | 60 | 3 | 37 |
| 4 | 8 | 2 | 65 | 4 | 31 |
| 5 | 5 | 4 | 70 | 3 | 27 |
| 6 | 4 | 2 | 78 | 3 | 19 |
| 7 | 6 | 1 | 85 | 4 | 11 |

The admixture is usually used for exerting an influence on characteristics of the concrete, such as workability, bleeding, curing time, compressive strength, change in length, neutralization, freezing and thawing process and thermal reliability against erosion by chemical substances. In addition, the admixture is used for restraining hydraulic heat. The admixture according to the present invention includes gray powder, which mainly consists of water-soluble cellulose ether. The cement is selected from products, which satisfy KSL 5201 and is suitable for KSF 2526 having an age less than two months after the cement has been manufactured. In addition, in the case of the mixing water, the mixing water harmless to the concrete is selected in use.

Physical properties of the concrete using the mortar manufactured through the above process are measured according to regulations including KSL 5105, KSL 5207, KSL 5104, KSF 2451, KSL 9016, KSF 2451, KSF 2424, KSF 2810, etc.

The physical properties of the concrete according to the present invention are shown in Table 2 in comparison with those of the related art.

The materials of the concrete are mixed through a concrete mixer on the ground of the construction site, and the mixed lightweight insulating urethane foam concrete is transported from the mixing area to a pouring area using a specifically developed pump such that the materials can be prevented from being separated from each other. In use of the concrete, if the conveyed materials of the concrete are applied to a construction part by a squeeze pump, the materials are evenly spread by using specific equipment and then the periphery of the concrete is flattened by a rod. In the process of conveying or pouring the lightweight insulating urethane foam concrete, if the materials are excessively separated from each other, the concrete is subject to a remixing process such that the concrete can be uniformly mixed. In addition, alien substances are prevented from being introduced into the concrete, and an area of the concrete, on which the alien substances are possibly absorbed, is wetted with water. When the concrete work is performed through at least two stages, concrete of a latter stage is poured before concrete of a former stage is hardened such that the concrete of the former stage is integrated with the concrete of the latter stage.

After the concrete has been poured, the concrete must be cured to prevent sudden change in the temperature. In addition, the concrete must be cured to prevent vibration, impact and excessive load from being applied to the concrete.

The curing period is at least 3 days in the summer season under the temperature of 30° C. and at least 4 to 5 days in the winter season over the temperature of 1° C. The curing process according to the present invention is performed similarly to the curing process of conventional concrete.

Result and Review

Table 2 represents the measurement result of curing characteristics for the urethane foam concrete manufactured according to the embodiment of the present invention.

TABLE 2

| CONCRETE TYPES | NORMAL CONCRETE | PAT. NO. 391558 | FOAM CONCRETE | CONCRETE USING MORTAR |
|---|---|---|---|---|
| Lightweight-air dried gravity(t/m$^3$) | 2.3-2.4 | 0.4-1.8 | 0.4-1.2 | 0.4-2.0 |
| Mechanical properties-compressive strength(kgf/cm$^2$) | 50-400 | 5-250 | 5-45 | 11-200 |
| Heat insulating property-thermal conductivity(kcal/m$^2$h° C.) | 1.3-1.4 | 0.08-1 | 0.12-0.2 | 0.08-1.2 |
| Moisture proof property-absorptivity (%) | 10-18 | 5-10 | 40-60 | 4-9 |
| Sound proof property-acoustic absorptivity (%) | 0.01-0.04 | 0.09-0.19 | 0.2-0.8 | 0.07-0.15 |
| Drying shrinkage-28 days-shrinkage | 4-6 | 0 | 4-8 | 0 |
| Durability-freezing/thawing resistance (%) | 70-80 | 90 | 50 | 87 |
| Fire proof property-compressive strength(600° C., 2 h)(%) | 10-20 | 50 | 50 | 58 |
| Vibration proof property-energy | 78 | 45 | | 46 |

As shown in Table 2, the urethane foam concrete using the mortar according to the present invention has a specific gravity of 0.4 to 2.0 whereas normal cement concrete has a specific gravity of 2.3 to 2.4. In this manner, the load of the concretes is reduced into less than a half or a third of the load of the normal concrete, so that the construction cost is reduced. In addition, the strength of the concrete is freely changed within a range of 11 to 200 kgf/cm2 depending on the combination of concrete. The concrete according to the present invention has a thermal conductivity of 0.08 to 1.2 kcal/m2h° C. corresponding to a half to a third of that of normal concrete (1.4 kcal/m2h° C.), so that the heat insulating effect is improved. In addition, the concrete according to the present invention has a superior adhesive property with respect to the mortar and forms a uniform mixture, thereby preventing cracks and delaminating. Such an effect is almost identical to that obtained by the Korean Patent Registration No. 391558, which has been filed by applicant and the effect can be realized without adding sand.

In addition, since the urethane foam concrete using the mortar according to the present invention has an excessively superior moisture proof property as compared with other types of concrete, dew condensation, molds and germs do not exert an influence on the concrete. The concrete according to present invention has the most superior sound absorbing property as compared with other types of lightweight insulating concrete. In addition, shrinkage does not exist and cracks caused by expansion/contraction are prevented from occurring in the concrete. Since the concrete can be hardened within a short hardening time of 3 to 4 days, the construction period can be shortened and the subsequent processes can be readily performed. In addition, since the concrete according to the present invention has superior freezing/thawing resistance to other types of concrete, dew condensation and winter-sowing are prevented. Since the concrete according to the present invention has superior impact energy absorptivity, vibration proof property is enhanced through absorption of vibration energy.

Although few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A method for manufacturing a mortar for concrete, the method comprising the step of pulverizing waste urethane foam and waste polystyrene foam into a size of 1 to 10 mm, respectively; forming urethane foam by mixing the waste urethane foam with the waste polystyrene foam in a weight ratio of 5-7:1-3 and adding gray powder, which consists essentially of water-soluble cellulose ether and serves as an admixture, to the urethane foam, wherein the mortar includes 60-80 volume perfect of the urethane foam, 1-4 volume percent of the admixture and 19-40 volume percent of cement.

2. A mortar for concrete, the mortar comprising: 60-80 volume percent of urethane foam, which is obtained by pulverizing waste urethane foam and waste polystyrene foam into a size of 1 to 10 mm and then mixing the waste urethane foam with the waste polystyrene foam in a weight ratio of 5-7:1-3; 1 to 4 volume percent of gray powder, which consists essentially of water-soluble cellulose ether and serves as an admixture; and 19 to 40 volume percent of cement.

* * * * *